B. W. JACKSON.
MEAT CLAMP.
APPLICATION FILED APR. 28, 1909.
949,900.
Patented Feb. 22, 1910.
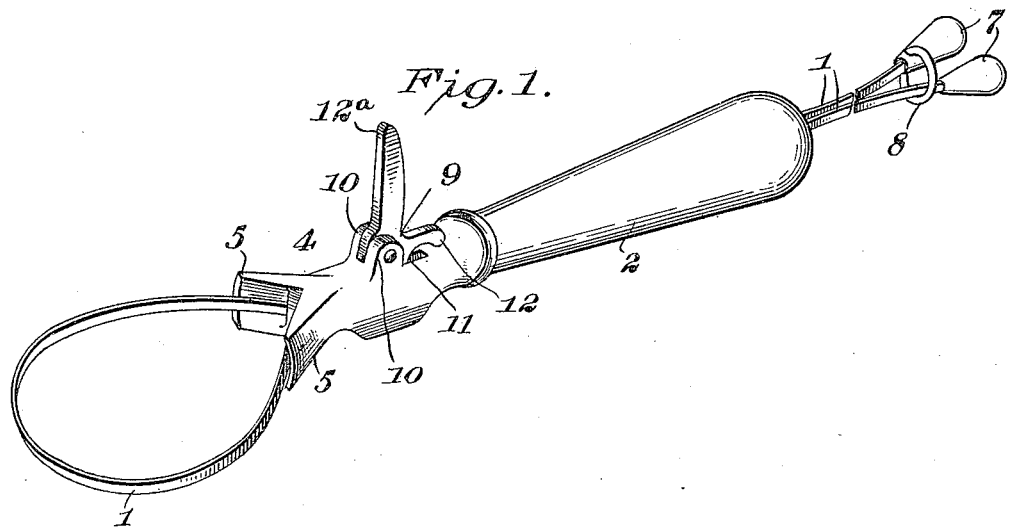
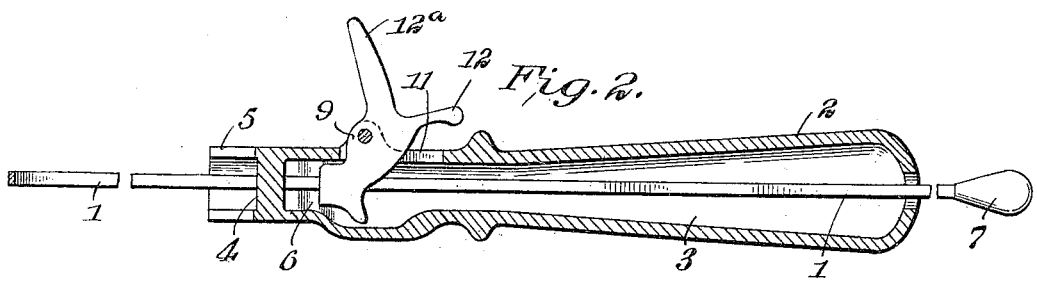
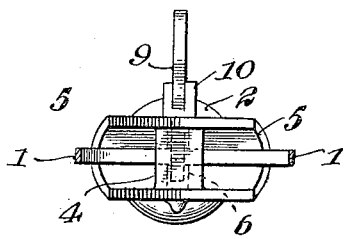
Inventor
B. W. Jackson,
Witnesses
By
Macy, Attorneys.

UNITED STATES PATENT OFFICE.

BIRNEY W. JACKSON, OF NEW YORK, N. Y.

MEAT-CLAMP.

949,900.  Specification of Letters Patent.  Patented Feb. 22, 1910.

Application filed April 28, 1909. Serial No. 492,705.

*To all whom it may concern:*

Be it known that I, BIRNEY W. JACKSON, citizen of the United States, residing at New York, in the county of New York and State of New York, have invented certain new and useful Improvements in Meat-Clamps, of which the following is a specification.

The object of this invention is a simple and efficient construction of device designed particularly for holding meat while carving the same, and the invention consists in certain constructions, and arrangements of the parts of the device that I shall hereinafter fully describe and claim.

For a full understanding of the invention, reference is to be had to the following description and accompanying drawings in which:

Figure 1 is a perspective view of a meat holding device constructed in accordance with my invention; Fig. 2 is a longitudinal sectional view thereof; and, Fig. 3 is an end view, the loop being shown broken away or in section.

Corresponding and like parts are referred to in the following description and indicated in all the views of the accompanying drawings by the same reference characters.

My improved meat holder comprises a loop or band 1 of some sufficiently strong and yet flexible substance or material such as spring steel, and a handle 2 coacting with said band. In the present embodiment of the invention the handle 2 is formed with a longitudinal opening 3 extending throughout the length thereof, and with a cross-bar 4 near one end, said cross-bar dividing the opening at one end of the handle into two branches, the extremities whereof are preferably divergent as indicated at 5. The ends of the band 1 pass into the branch openings 5 on opposite sides of the cross-bar 4 past preferably thickened walls 6 located close to the cross-bar as clearly illustrated in the drawing, the ends of the band finally passing out of the opposite end of the handle and being provided with knobs 7 or the like by which they may be grasped for the purpose of drawing the band through the handle. Preferably one of the knobs 7 is provided with a ring 8 designed to extend around the other end of the band so as to hold the two ends properly together, and prevent the band from becoming sprung.

In order to hold the band 1 tightly in the handle, so that the loop formed thereby may securely engage the ham, or roast or the like which it encircles, I have provided a latch or pawl 9 which is preferably stamped out of sheet metal and which is pivotally mounted intermediate its ends between ears 10 formed on the handle. One end of the pawl 9 passes downwardly through a recess 11 formed in the handle and is designed to crowd the two ends of the band 1 against the interior wall of the handle so as to tightly hold the band at the desired adjustment. The upper end of the pawl 9 is provided with a thumb piece 12 by which it may be manipulated and held securely in locking engagement with the band; and in addition to these parts, it is to be particularly noted that the pawl is provided with an upwardly and preferably forwardly projecting extension $12^a$ which serves as a finger guard to shield the thumb and hand from injuries that might be inflicted thereupon by the knife when the carver cuts toward himself.

From the foregoing description in connection with the accompanying drawings, it is manifest that my improved meat holder may be cheaply manufactured and the parts readily assembled and that it will be durable in construction and not liable to get out of order. As both ends of the band 1 are free to move through the handle 2 in the adjustment of the device, it is evident that the adjustment may be quickly effected, and more expeditiously than would be possible with a construction in which one end of the band was rigidly secured to the handle.

Having thus described the invention, what is claimed as new is:

1. A meat holder, comprising a handle having a longitudinal opening extending therethrough, a band the ends of which are passed through said handle, means for holding the band at different adjustments relative to the size of the loop, and a ring connected to one extremity of the band and engaging the opposite extremity thereof as and for the purpose set forth.

2. A meat holder, comprising a handle having a longitudinal opening extending therethrough and formed with a cross bar near one end and divergent branch openings at opposite sides of the cross bar at said end, a band having both ends passed freely inwardly through said branch opening at opposite sides of said cross bar and out through the other end of the handle, and a latch mounted on the handle and extending into the same and arranged to wedge the band against the interior wall of the handle.

3. A meat holder, comprising a handle having a longitudinal opening extending therethrough, and provided at one end with a cross bar extending across said opening and with spaced exterior ears between said cross-bar and the opposite end of the handle, a latch pivotally mounted between said ears and passing into the opening into the handle, a band having its ends passed into the handle, on the opposite sides of said cross bar and arranged for engagement at the inner end of the latch whereby to hold the band at different adjustments, the extremities of the band passing out of the opposite end of the handle, the latch being provided on the outside of the handle with a thumb piece, and a guard extending upwardly and forwardly therefrom.

In testimony whereof I affix my signature in presence of two witnesses.

BIRNEY W. JACKSON. [L. S.]

Witnesses:
 HENRY T. GUSTAVESON,
 ALEXANDER ANDERSON.